United States Patent [19]

Engelsberger

[11] Patent Number: 4,937,113

[45] Date of Patent: Jun. 26, 1990

[54] MULTILAYER FILM FOR VACUUM PACKAGING

[75] Inventor: Herbert Engelsberger, Viersen, Fed. Rep. of Germany

[73] Assignee: Helio Folien GmbH, Viersen, Fed. Rep. of Germany

[21] Appl. No.: 168,706

[22] Filed: Mar. 16, 1988

[30] Foreign Application Priority Data

Mar. 18, 1987 [DE] Fed. Rep. of Germany ....... 3708780

[51] Int. Cl.$^5$ .................. B32B 3/18; B32B 31/10; B27N 5/02
[52] U.S. Cl. ............................... 428/35.3; 428/35.4; 428/132; 428/220; 428/458; 428/461; 428/463; 428/476.9; 428/516; 428/518; 428/910; 428/349; 156/253; 156/510; 426/127
[58] Field of Search .................. 428/35.3, 35.4, 476.9, 428/132, 458, 463, 220, 461, 518, 910, 516

[56] References Cited

U.S. PATENT DOCUMENTS

| 4,326,909 | 7/1982 | Slavik . |
| 4,601,930 | 7/1986 | Engelsberger . |
| 4,837,084 | 6/1989 | Warren .......................... 428/516 |

FOREIGN PATENT DOCUMENTS 3216097 9/1984 Fed. Rep. of Germany .

Primary Examiner—P. C. Ives
Attorney, Agent, or Firm—Felfe & Lynch

[57] ABSTRACT

Disclosed is a multiple-layer film having a support film, a first double film laminated thereto, which is formed from a single-ply blown tube collapsed by atmospheric pressure. The support film and the double film laminated thereto are perforated with pinholes. On the side opposite the support film the double film is laminated to a barrier film and the latter is laminated to a weldable layer of film.

13 Claims, 5 Drawing Sheets

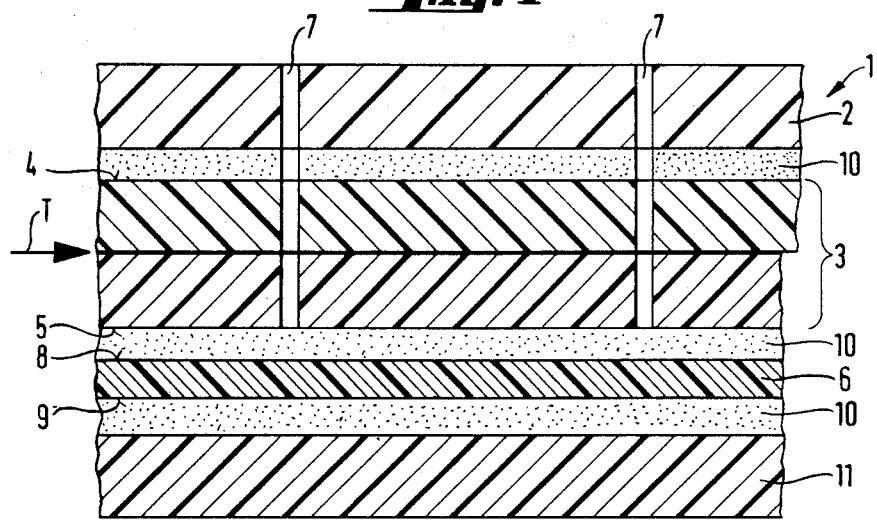
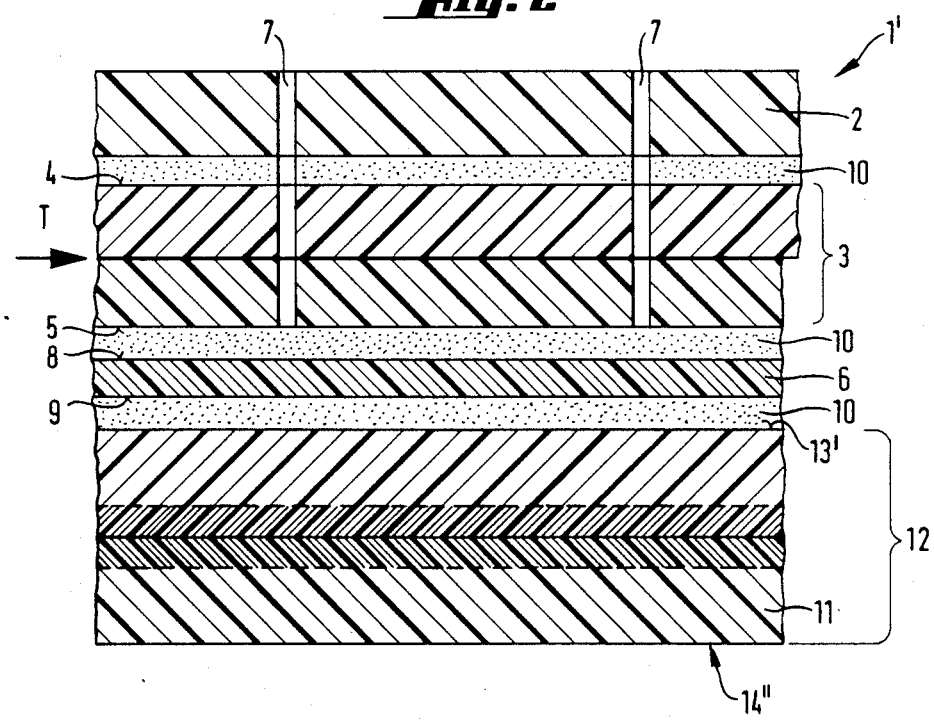

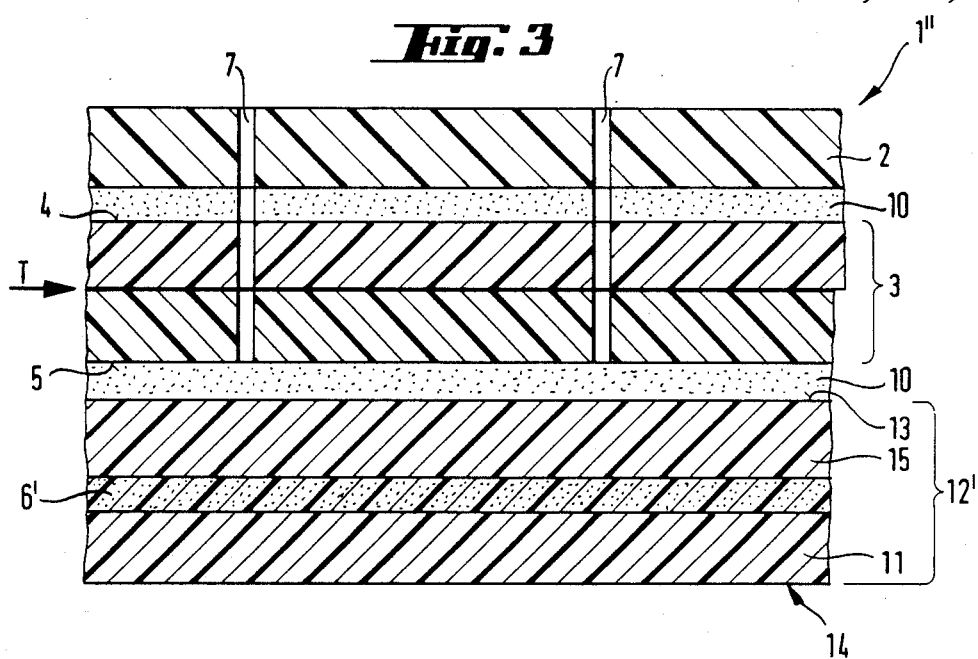
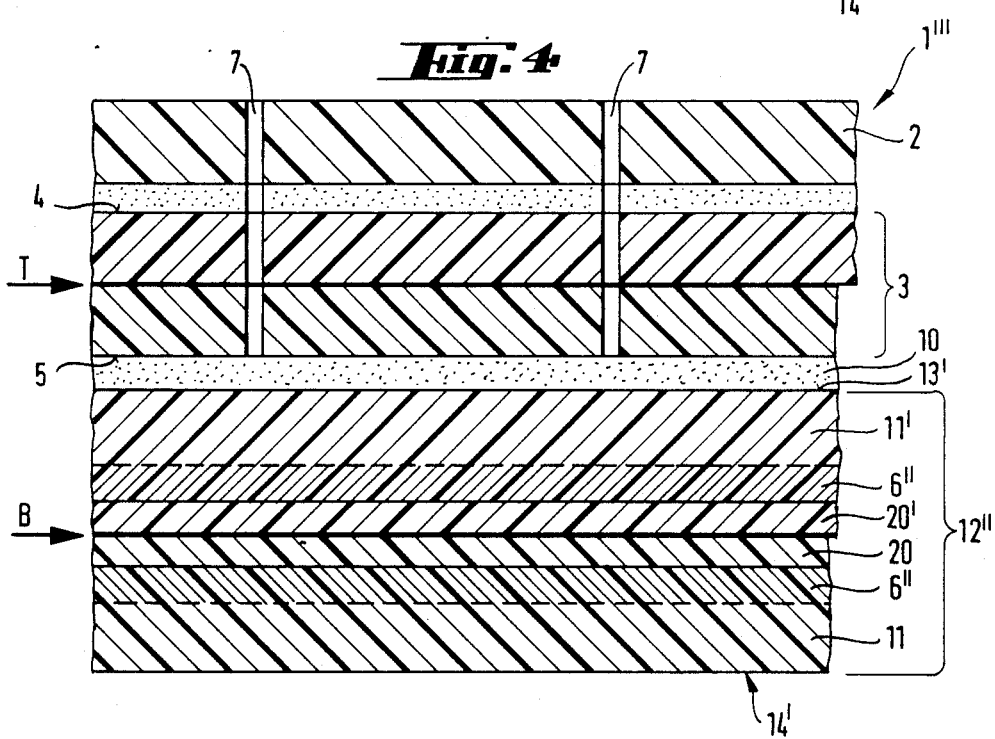

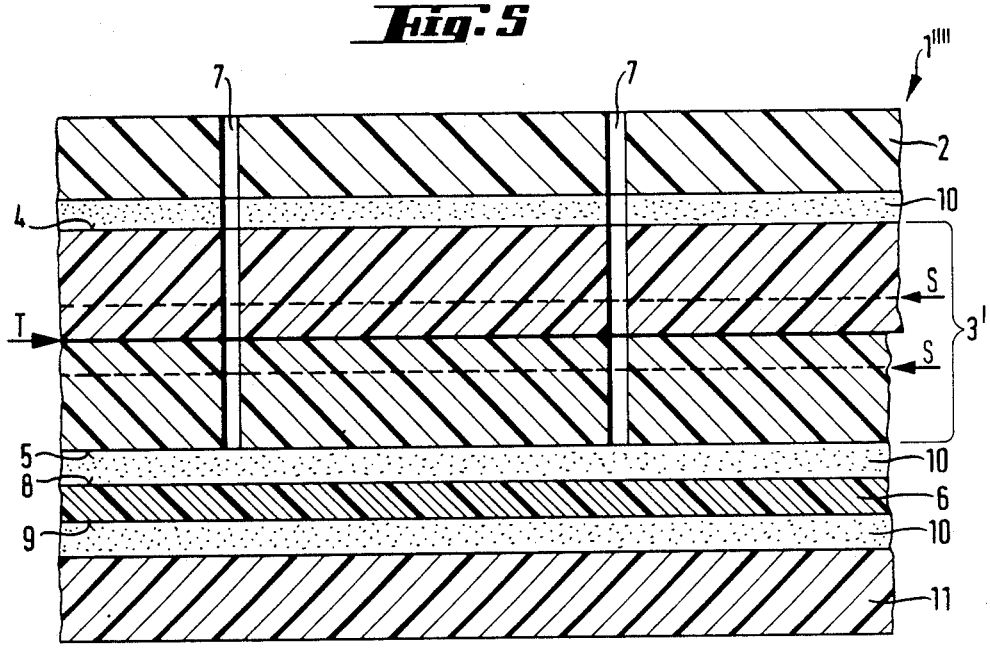

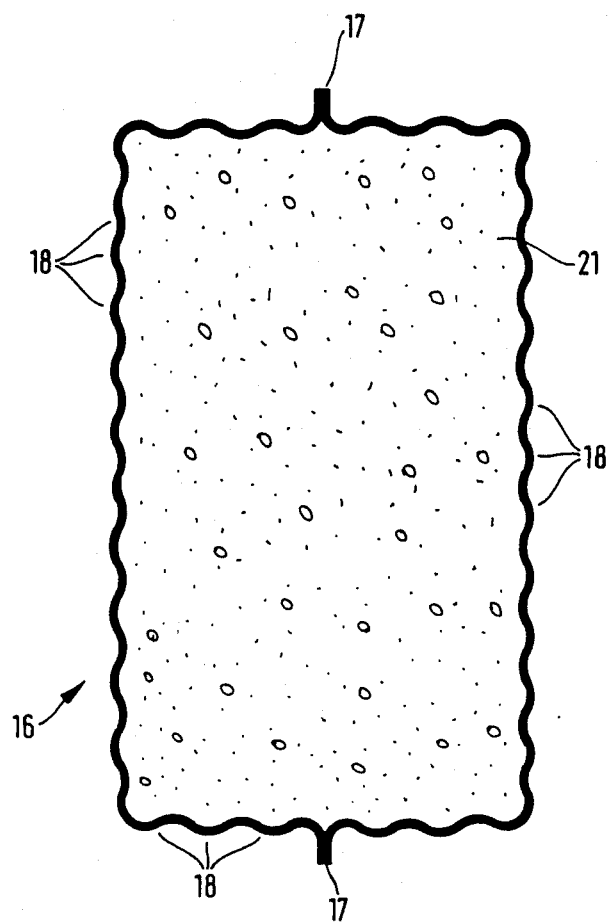

MULTILAYER FILM FOR VACUUM PACKAGING

BACKGROUND OF THE INVENTION

The present invention is in a multiple-layer film, a method for the production of the film, and its use.

DE-PS 32 16 097 discloses a multilayer film which is made from a support film of one or more layers and a blown, coextruded composite film joined by means of an adhesive thereto whose layers consist of polyethylenes or polyethylene copolymers of different mechanical shock strength. The coextruded composite film consists of a two- to five-ply collapsed blown tube which has two outer layers of the same material and thickness, two inner layers of the same material and thickness, and, in some cases, up to three intermediate layers between each inner and outer layer. The inner layers are held together by blocking and the outer layers in the case of a double film with no intermediate layer are bonded to the inner layers by fusion.

This known film, which in past years has acquired great economic importance, has been used with great success especially in the vacuum packing of ground coffee. A considerable reduction of leakage rates can be achieved with this known multilayer film.

The disadvantage of the above-described film, as well as of other multilayer films used in the packing of coffee, is that, as a result of the compression wrinkles which develop in vacuum packing, the finished package has an unsightly exterior and especially the decoration or lettering applied to the film appears to be blurred. This disadvantage, which detracts from appearance, is to be attributed to the fact that, when the vacuum is applied, the imprinted film is drawn close against the ground coffee and the shapes of the coffee grounds are visible on the outside of the multilayer films.

A frequently used remedy is to provide the above-described inner package formed from a multilayer film with a so-called outer wrapper of printed paper, paper-backed aluminum, or a folding box of printed cardboard. This remedy not only adds material cost for the additional outer wrapper or folding box, but also requires a greater expenditure of labor, since two feed stations, one for the outer wrapper and one for the inner wrapper, must now be served. This results in more frequent roll changing and the mess accompanying the use of glue.

It is therefore an objective of the present invention to provide a multiple-layer film suitable for vacuum packaging, which, while avoiding the outer wrapper previously considered necessary, results in an attractive-looking package with a perfect visual impression, without losing the advantages of the multilayer films of the prior art but with no additional expenditure of labor as in the case of the packaging bags previously made from a single-ply wrapper.

SUMMARY OF THE INVENTION

The above objective and others are achieved by the present invention.

The present invention is in a multiple-layer film formed from a single-ply or multilayer support film forming a top. The multiple-layer film has a first double film which can consist of polyethylene or polyethylene copolymer, formed from a collapsed blown tube bonded internally by blocking. This first double film is bonded to the support film by means of an adhesive. The support film and the first double film have at least one perforation therethrough. A weldable film layer is disposed on the underside of the multilayer film. A gas barrier layer is intermediate the first double film and the weldable film layer.

In the production of a packaging bag, the support film forms the outside of the package unit and the graphic design or lettering or the like is applied to it. The production of a package unit, e.g., in the form of a bag, is the same as the production of a bag from a single wrapper, which, as mentioned above, is to be understood to mean the production of a bag from a single web of film and this bag is used without any additional external wrapping of paper or the like.

While in the case of the known single wrappers, however, there was the disadvantage that, after the evacuation of the filled bag, wrinkles developed and the imprint was less sharp and clear, the invention makes possible the production of a considerably more attractive-looking package with considerably improved imprinting, and achieves a better overall visual impression. This result is obtained because after the evacuation, air penetrates through at least one hole created by perforating the support film, the first double film and the adhesive layer bonding the support and first double film, and the first double film is separated again internally, i.e., at the interface. Thus a kind of plane of cleavage develops, so that the multiple-layer film is divided into a first part which consists of the support film and the one half of the first double film which is bonded to the support film, and a second part which consists of the second half of the first double film, the barrier film, and the additional double film or the single-ply film forming the fusible layer. The result is a package in which the advantages of the so-called single wrapper are combined with the advantages of a package formed of an inner and outer wrapper. Thus, of course, the disadvantage of the known packages consisting of an inner and outer wrapper is eliminated, which consisted in the fact that, in the filling of a coffee bag for example, small amounts of the coffee powder entered between the inner and outer wrapper.

Another advantage over the formerly known single wrappers is that the disadvantage of an excessively low resistance to perforation in the known multilayer films no longer exists. Also eliminated is the disadvantage encountered in packaging units consisting of inner and outer wrappers of having to seal the filled units at their top by a so-called head label provided with glue, since the film according to the invention can be sealed securely and cleanly due to the weldable film layer disposed on its underside.

The first double film is completely perforated by the process, including the half which after separation remains with the second part of the multiple-layer film, which contains the barrier film, but this is without any importance to the function of the invention, since all the rest of the layers are joined together either by laminating or by fusion, unless the weldable film layer is a component of such an additional double film which consists of a collapsed multilayer blown tube in which the inner layers are also bonded together by blocking. In such a case, after the separation of the first double film, the second half or the multilayer film will be the same as a multi-layer film in accordance with DE-PS 32 16 097.

It is important for the purposes of the invention that the inner layers of the first double film laminated to the support film are held together by blocking. If such a double film consists of only one single-ply, collapsed blown tube, blocking is produced at the inner surfaces of the blown tube. In a multilayer blown tube, as described in DE-PS 32 16 097, the blocking takes place between the innermost layers, the outer layers being joined to the innermost layers by fusion.

The functionality of the multilayer film proposed according to the invention depends on whether the described blocking is on the one hand strong enough to prevent premature separation, but on the other hand, after the filled package has been evacuated and the latter is exposed again to the ambient air, the desired separating effect between the layers held together by blocking has to take place. Due to the high strength of the bond, separation cannot occur between the outer and inner layers of the double film, joined by fusion, and formed of a double-walled blown tube.

At the places on a packaging bag—made from a multiple-layer film according to the invention—at which the weld is applied which seals the bag, even the areas which are only held together by blocking in the production of the double film will of course be bonded together by fusion. The separation takes place only at areas which have not been welded.

The number of perforation holes is to be coordinated with the blocking bond that has established itself within the first double film. The holes can be uniformly distributed on the surface of a piece cut to form a package unit, or arranged along lines or in patterns. A few holes may suffice, or under certain circumstances even a single hole per cut piece.

The following film thicknesses have proven especially suitable in the production of the multiple-layer film according to the invention:

Support film: 10 to 15 microns.

First double film: single-ply collapsed blown tube: total thickness 20 to 40 microns, i.e., the wall thickness of the tube 10 to 20 microns; two-layer coextruded blown tube: total thickness 20 to 40 microns and single layers of 5 to 15 microns.

Barrier films: aluminum, about 6 to 10 microns polyester or polyamide, 12 to 15 microns.

Additional double films of coextruded, two-ply blown tube: 60 to 80 microns.

The flexo printing process and the intaglio printing process for the counterprinting of the support film have proven to be especially good printing processes for the application of decoration or lettering.

The laminating can be performed on the entire surface or the adhesive can be applied spot-wise. In a preferred embodiment, there is a full-surface application of the adhesive agent between the support film and the first double film. As a suitable adhesive a two component polyurethan combined with an usual solvent therefore may be used.

A weldable film layer, formed of a single-ply film, is an especially low-cost embodiment of the present invention on account of its uncomplicated composition. The material of such a film is preferably low-density polyethylene (LDPE), ethylene-vinyl acetate copolymers (EVAC) or linear low-density polyethylene LLDPE. If the weldable film layer is a component of another double film, a coextruded double film, as described in DE-PS 32 16 097 as a component of a multilayer film, has proven especially suitable. If one or more barrier films are provided as intermediate layers within a double film having a weldable film layer, the barrier films can be provided with additional coats or adhesive for the achievement of sufficient bond strength with the other film layers.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIGS. 1 thru 5 generally show enlarged cross sections, not drawn to scale, of different embodiments of the multiple-layer film of the invention;

FIG. 6 shows, in simplified form, a cross section through a known packaging bag made from a single-ply wrapper.

DESCRIPTION OF PREFERRED EMBODIMENT

Figure 7:
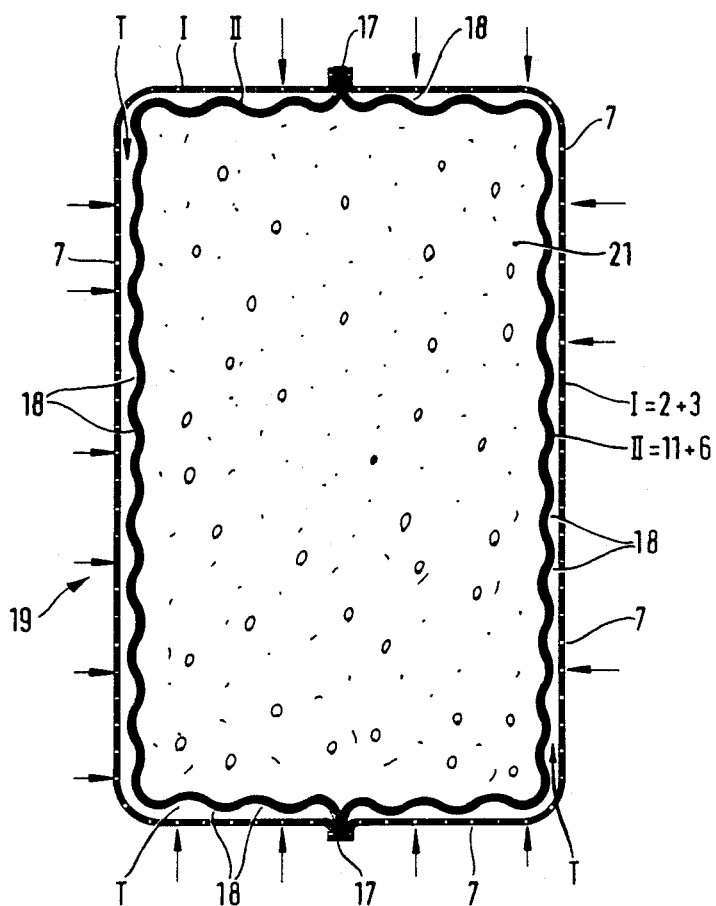
FIG. 7 shows, in simplified form, a cross section through a packaging bag, made from a multilayer film corresponding to the invention.

Referring to FIG. 1, a multiple-layer film 1 consists of a support film 2 which is laminated by means of adhesive layer 10 to an outer side 4 of the double film 3 formed from a single-ply, collapsed blown tube 3. The support film 2 can be a biaxially oriented polyester having a thickness of approximately 12 microns. The double film 3 is made from a single-ply polyethylene blown tube, having a wall thickness of 15 microns and a total thickness of 30 microns. On another outer side 5 of the double film 3 there is applied an additional adhesive layer cement 10 which bonds the one side 8 of a barrier film 6 to the double film 3. The adhesive layer 10 is applied at a concentration of approximately 1.8 g/m$^2$ when containing solvent.

Another side 9 of the barrier film 6 is joined by an additional adhesive layer 10 to a weldable film layer 11 formed of a single-ply film. The barrier film 6 is an aluminum film having a thickness of approximately 7 microns. Weldable film layer 11 is a single-ply film of polyethylene having a thickness of about 70 microns.

The support film 2 and the double film 3 joined to it by adhesive layer 10 are perforated with at least one hole 7. Two holes 7 are used for purposes of illustration. After evacuation, the air entering through the holes 7 permits the separation of the double film at the interface marked with the arrow T, at which the double film is bond together by blocking.

FIG. 2 shows an alternate embodiment. In the embodiment of FIG. 2, a multilayer film 1' is the same as the multilayer film shown in FIG. 1. In place of the single-ply film forming the weldable film layer 11, the FIG. 2 embodiment has an additional double film 12 which is formed by a two-layer, coextruded, collapsed blown tube. The double film 12 is joined on one side to the barrier film 6 by laminating while its other side 14'' is formed by the weldable film layer 11. Weldable film layer 11 as part of the additional double film 12 is of polyethylene 25 microns thick.

FIG. 3 shows another alternate embodiment of the invention. FIG. 3 shows a multiple-layer film 1'' having the support film 2 and the double film 3 which are the same as in the embodiments described at FIGS. 1 and 2. The barrier film 6', however, is a component of an additional, three-ply double film 12' in which the one side 13, formed by layer 15, is joined to the double film 3, while the other side 14 of the double film 12' is formed by the weldable film layer 11. The barrier film 6', which is formed of an ethylene/vinyl alcohol copolymer EVOH and which is about 5 microns thick, is joined by means of an adhesive - not shown - to the layer 15 and to the weldable film layer 11 by coextrusion. Weldable film layer 11 as part of the additional double film 12' is of polyethylene 30 microns thick.

In the embodiment of FIG. 4, the multiple-layer film 1''' has the same support film 2 and double film 3 described in the previous embodiments. However, multiple-layer film 1''' has an additional double film 12'' formed of a three-ply, coextruded and collapsed blown tube which is held together by blocking at the point identified by the arrow B. Barrier films 6'' form intermediate layers of the blown tube. The one side 13' of the additional double film 12'' is again bonded by adhesive layer 10 to the first double film, and the other side 14' of the double film 12 is formed by the weldable film layer 11. Weldable film layer 11 as part of the additional double film 12'' is of polyethylene 15 microns thick.

Since the double film 12'' is formed of a collapsed blown tube, the weldable film layer 11 is of the same thickness and material composition as the layer 11' which is laminated to the double film 3. In the same manner that barrier films 6'' correspond with each other, inner layers 20 and 20' also are identical with regard to thickness and raw material composition. The layers 11 and 11' are bonded by fusion to the barrier films 6 and 6' and the latter are bonded by fusion to the inner layers 20 and 20' by coextruded adhesive mediating layers not shown. The inner layers 20, 20' of the additional double film 12'' are each of polyethylene and 5 microns thick.

In the embodiment of FIG. 5 a multiple-layer film 1'''' has a double film 3' which is joined to the support film 2 and with the barrier film 6. The double film 3' is constructed of a two-ply blown tube having an inner layer of ethylene/vinyl acetate copolymer, approximately 5 microns in thickness and an outer layer of polyethylene which is 10 microns thick. The two-ply collapsed blown tube has a total thickness of 30 microns. The arrow T again points to the cleavage plane at which the double film 3' formed of a two-ply blown tube is bond together by blocking and at which after the evacuation is completed separation occurs as the result of the air entering through the holes 7. At the points identified by arrow S the layers of the double film 3' made by coextrusion are bonded by fusion. The double film 3' is joined at its outer side 5 through the adhesive 10 to the one side 8 of the barrier film 6, which on its other side 9 is bonded to the weldable film layer 11 formed of a single-ply film by the additional adhesive layer 10.

FIG. 6 shows a packaging bag 16 made from a prior-art single wrapper, immediately after completion of the evacuation. Welded seams 17 seal the bag 16 on both sides. It is easy to see how wavy contours are formed by shrinkage wrinkles 18 and thus how the entire package is given an unattractive appearance.

The package bag shown in FIG. 7 consists of the multiple-layer film according to the invention, which here is represented in simplified form. The arrow T points to the interface at which the multilayer film has been split apart after completion of the evacuation, by the air that has entered through the holes 7 into portion I consisting of the support film 2 and the one half of the double film 3 which is no longer squeezed by the external air pressure acting against the vacuum, and the portion II consisting of the barrier film 6 and the weldable layer 11. It can clearly be seen that the portion II is tightly forced by the vacuum against the contents 21, but the shrinkage wrinkles 18 do not press against portion I and this portion therefore has an attractive appearance and acts as an outer wrapper.

It will be understood that the specification and examples are illustrative but not limitative of the present invention and that other embodiments within the spirit and scope of the invention will suggest themselves to those skilled in the art.

I claim:

1. A multiple-layer film comprising:
    a single-ply or multilayer support film forming a top;
    a first double film consisting of polyethylene or polyethylene copolymer, formed from a collapsed blown tube bonded internally by blocking,
    a first adhesive layer, said first double film being bonded by means of said adhesive layer to said support film, said support film and the first double film having at least one perforation therethrough;
    a weldable film layer disposed on the underside of the multiple layer film
    a gas barrier layer intermediate the first double film and said weldable film layer; and
    a second adhesive layer, said first double film being bonded by means of said second adhesive layer to said gas barrier layer.

2. The multiple-layer film of claim 1 further comprising a second double film joined to said gas barrier layer with its one side and forming said weldable film layer on its other side.

3. The multiple-layer film of claim 1 wherein the barrier film is of a material selected from the group consisting of aluminum, oriented or unoriented polyamide or polyester, metallized or PVDC varnish-coated polyamide or polyester, or an ethylene/vinylalcohol copolymer.

4. The multiple-layer film of claim 1 wherein the double film is formed of a single-ply blown tube.

5. The multiple-layer film of claim 1 wherein the double film is formed from a co-extruded two- to five-ply, collapsed blown tube whose outer layers are bonded to the inner layers by fusion bonding.

6. The multiple-layer film of claim 1 wherein the support film is selected from the group consisting of biaxially oriented polyester, polyamide or polypropylene.

7. The multiple-layer film of claim 2 wherein the second double film is formed from a coextruded two- to five-ply, collapsed blown tube whose outer layers are bonded to the inner layers by fusion bonding and whose inner layers are joined together by blocking.

8. The multiple-layer film of claim 1 wherein the least one perforation has a diameter of 0.2 to 1.0 mm.

9. A multiple-layer film comprising:
    a single-ply or multilayer support film forming a top;
    an adhesive layer;
    a first double film consisting of polyethylene or polyethylene copolymer, formed from a collapsed blown tube bonded internally by blocking, said first double film by means of said adhesive layer being bonded to said support film, said support film and the first double film having at least one perforation therethrough;
    a second adhesive layer;

a second double film, having an upperside bonded by means of said second adhesive layer to said first double film, said second double film having an underside which forms a weldable film layer; and at least one gas barrier layer forming at least one intermediate layer to said second double film.

10. The multiple-layer film of claim 9 wherein the barrier film consists of polyvinylidene chloride, an ethylene/vinyl alcohol copolymer or an unoriented, aromatic polyamide.

11. The multiple-layer film of claim 9 wherein the second double film is formed from a co-extruded three- to five-ply, collapsed blown tube and two intermediate layers of an additional compound film are in the form of the least one barrier film.

12. A package for the vacuum packing of free-flowing granulated material made of the multilayer film of claim 1.

13. A package for the vacuum packaging of ground coffee made of the multilayer film of claim 1.

* * * * *